(12) United States Patent
Hattori

(10) Patent No.: US 7,295,712 B2
(45) Date of Patent: Nov. 13, 2007

(54) METHOD OF IMAGE DATA COMPRESSION AND DATA TRANSFER SYSTEM USING THIS METHOD

(75) Inventor: Osamu Hattori, Chiba (JP)

(73) Assignee: Seiko Instruments Inc. (JP)

( * ) Notice: Subject to any disclaimer, the term of this patent is extended or adjusted under 35 U.S.C. 154(b) by 807 days.

(21) Appl. No.: 10/674,089

(22) Filed: Sep. 29, 2003

(65) Prior Publication Data
US 2005/0013492 A1 Jan. 20, 2005

(30) Foreign Application Priority Data
Oct. 1, 2002 (JP) .............................. 2002-288414

(51) Int. Cl.
*G06K 9/36* (2006.01)
(52) U.S. Cl. ...................... 382/232; 382/166
(58) Field of Classification Search ................ 382/232, 382/233, 166, 235; 345/63, 67, 60, 62, 690; 315/169.4; 348/797
See application file for complete search history.

(56) References Cited

U.S. PATENT DOCUMENTS 6,646,625 B1 * 11/2003 Shigeta et al. ................ 345/63
6,967,636 B2 * 11/2005 Shigeta et al. ................ 345/63

FOREIGN PATENT DOCUMENTS

| JP | 10145796 | 5/1998 |
| JP | 00083253 | 3/2000 |
| JP | 00181439 | 6/2000 |
| JP | 01142437 | 5/2001 |

* cited by examiner

*Primary Examiner*—Anh Hong Do
(74) *Attorney, Agent, or Firm*—Adams & Wilks

(57) ABSTRACT

In an image compression method, there is provided at least one display image comprising pixels each including color attribute data separated into upper bits and lower bits. The lower bits of the color attribute data for each pixel of the display image are eliminated. The upper bits of the color attribute data are extracted for each pixel of the display image. The upper bits of the color attribute data for each pixel of the display image are combined together to thereby compress the display image.

10 Claims, 7 Drawing Sheets

METHOD OF IMAGE DATA COMPRESSION AND DATA TRANSFER SYSTEM USING THIS METHOD

BACKGROUND OF THE INVENTION

1. Field of the Invention

This invention relates to a Data Compression Method and a Data Transfer System using the data compression method.

2. Description of the Prior Art

It is quite common to transfer an image data after compressing it when a steady image or moving images are transferred electrically. The compression techniques are categorized in two methods, the reversible method such as GIF (Graphics Interchange Format) method and PNG (Portable Network Graphics) method and the irreversible method such as JPEG (Joint Photographic Coding Experts Group) method and MPEG (Moving Picture Coding Experts Group) method.

The compression rate is higher in the irreversible method than in the reversible one so that very often the irreversible method is employed when the data size is big and it is not necessary to recover the original data. The data size after the compression is dependent upon the image when employing the irreversible method. The irreversible method has a tendency, in general, to have a lower compression rate when color variation is large in an image. FIG. 7 shows an example of a compression method by classifying color. A choice of color is among 65,536 different colors upon the computer display when 'Full Color' is chosen. It is, therefore, necessary to deal with 65,536 different colors to compress at most. On the contrary, the compression rate becomes higher if the number of colors is minimized. Therefore, a mono-colored image ends up with a high compression rate and a colorful image ends up with a lower compression rate. Thus, the data size after compression is variable.

As a data culling process by a simple calculation taking in consideration the nature of human optical behavior, the portion of culled data has the feature that the averaged brightness data of 4 pixel points taken by the computer became the brightness data of the new pixel point after culling data. The color difference value of the new pixel point after culling data is preventively assigned to be the predefined color difference value based upon the color difference values of the 4 pixel points. (Laid-Open Application No. JP8-340552 (Page 4 to 5 and FIGS. 1-2)).

While transferring a large data without demanding reversibility, there may be two separate demands. The first demand may be the case the image quality is important and the transfer speed is important. For the irreversible compression technique the compression rate can be defined by the characteristic of the image such as, for example, the number of colors in the image even when data reappearability is taken into consideration. There is a case that the reappearability of compressed data is not important, in other words, when the number of colors to reappear is not large. For example, most LCD projectors have 3 LCD units for light modulation to handle 3 colors, Red, Green and Blue. It is also common that the digital-analog transformer that defines the tone of color handles 256 colors. Moreover, it is also common for a color printer not to reappear 'Full Color' for an image. Data communication between the two systems have different image resolutions, for example from a personal computer having a display capability of the XGA (extended Graphics Array) standard to a LCD projector having SVGA (Super Video Graphics Array) display capability, it is profitable to cull pixel points before compression because the XGA standard has more pixel points than the SVGA standard.

It takes sometime for data transfer while having a presentation sending data to an LCD projector through a radio data transfer system. If the data transfer time is constant, the presentation is performed with the certain interval taking into account the data transfer time and the time until the display shows up. It is necessary to have an automated compression system to approximate the compression rate without dependence upon the nature of the image.

It is known that the error rate increases while the transferring data rate using wired or radio communication system increases. Once a data error occurs, the portion of broken data has to be corrected by sending the same data set. The error rate, however, remains low if the quantity of data is small.

Data transfer by radio often uses mono frequency and a half duplex protocol so that the data transfer is asynchronous in general. Sending data asynchronously take more time than sending it synchronously because asynchronous does not go high on the data transfer rate than synchronous. A high data transfer time increases the chance for the data to be perturbated by noise and/or interference. The quantity of data for each transmission is preferably short and the equal amount for the point of view to employ the packet communication method.

SUMMARY OF THE INVENTION

The image compression method of this invention is comprised a step to eliminate bits rather than upper bits of color attribute of each pixel of an image to be displayed that is necessary to define the color of the pixel, a step to extract the upper bits and a step to connect between the upper bits.

The image compression method of this invention has a step to modify the number of upper bits taken by each image to be displayed. The number of upper bits taken is defined per every image so that it is possible to compress every image data into the size of the same transfer time.

Data communication system having an interface to make a connection with an outer system, a control unit to receive a command of compression from the outer system through the interface described above and a data compressing unit performing data compression based on the compressing command by the image compressing techniques. The data compression unit compresses data with an adequate compression rate so that it is possible to minimize the transfer time and the data quantity.

The data transfer system of this invention has a transceiver to radio transfer the compressed image data done by the image-compressing unit. Using the compressed data makes less chance to discontinue the transfer even if the transfer data rate is low as radio communication compare to wired communication.

The data transfer system of this invention changes the compression rate of each image in order to unify the data transfer time. The image-compressing unit estimates the transfer time from the size of each image and changes the compression rate of each image in order to put the transfer time within the range, and the transfer time of each image becomes within the range.

BRIEF DESCRIPTION OF THE DRAWINGS

A preferred form of the present invention is illustrated in the accompanying drawings in which.

DETAILED DESCRIPTION OF THE PREFERRED EMBODIMENTS

The explanation of this embodiment is targeted to the case of displaying an image upon a LCD projector transferred from a personal computer through radio data link. The personal computer (PC) is supposed to have a displaying unit of XGA standard and color grade is set 'Full Color.' The LCD projector is supposed to have a LCD panel of SVGA standard and the color grade is 3 primary colors of red, green and blue and totally 8 colors.

Figure 1:
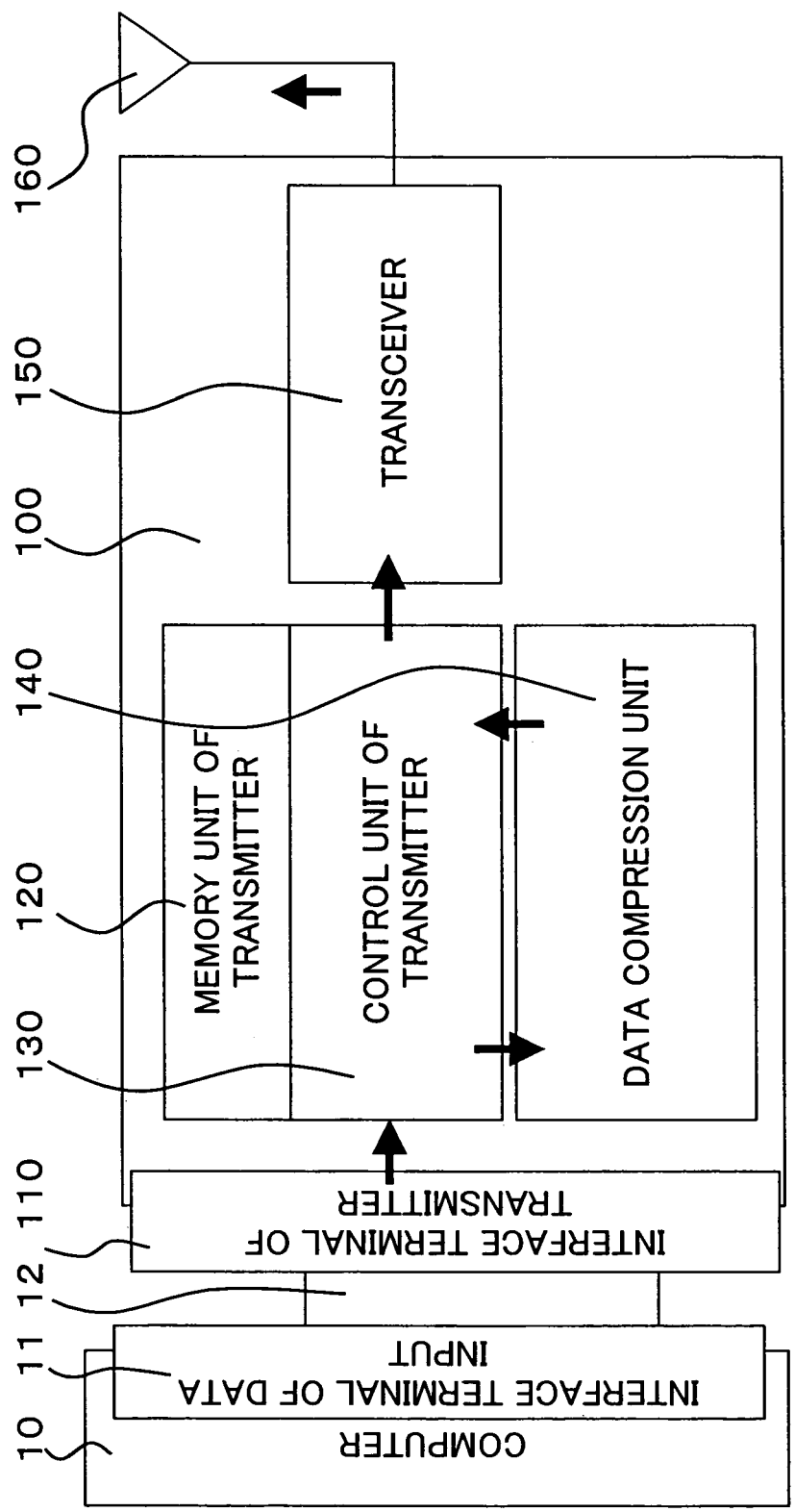
FIG. 1 is a block diagram of the PC side communication unit.

FIG. 1 shows the block diagram of the communication unit of PC side 100 that is attached to the PC. The PC side communication unit 100 is comprised of an interface terminal 110 that makes a connection with a computer 10, a transmitter side memory unit 120 that holds many different software and data for transmission, a transmitter side control unit 130 that commands compression of data as an image outputted from the computer 10 and that commands a transceiver unit 150 to send data such as an image, a data compression or compressing unit 140 that compresses the data such as an image, and a transceiver unit 150 that sends the compressed data and an antenna 160 that sends and receives radio frequency.

The transmitter side interface terminal 110 is connected to the data providing side interface terminal 11 by the connector 12. This connection may provide not only data such as images but also the power to make the PC side communication unit 100 to work. The transmitter side control unit 130 sends commands to compress the data such as an image inputted from the transmitter side interface terminal 110 and commands to transmit toward the LCD projector side communication unit 200. When the LCD projector side communication unit 200 cannot receive the data or the data itself is broken, the data is repeatedly sent toward the LCD projector side communication unit 200. A microcomputer can be used. The data compressing unit 140 handles data compression of images. The compression rate can be selected in relation to the transfer time of the information. An integrated compression circuit can be used. The transmitter side memory unit 120 holds the data compressed at the data-compressing unit 140. One frame of the image is stored in the memory. The transceiver unit 150 sends the data toward the LCD projector side communication unit 200 and it receives a confirmation signal of whether the LCD projector side communication unit 200 received the data correctly or not. Both transmitting frequency and receiving frequency are the same frequency. The antenna 160 can be either unidirectional or multi-directional.

The computer 10 outputs the data such as an image through the data providing side interface terminal 11 provided by the computer 10. The computer side communication unit 100 and the computer 10 are connected by the connector 12. The connector 12 can be a cable.

Figure 2:
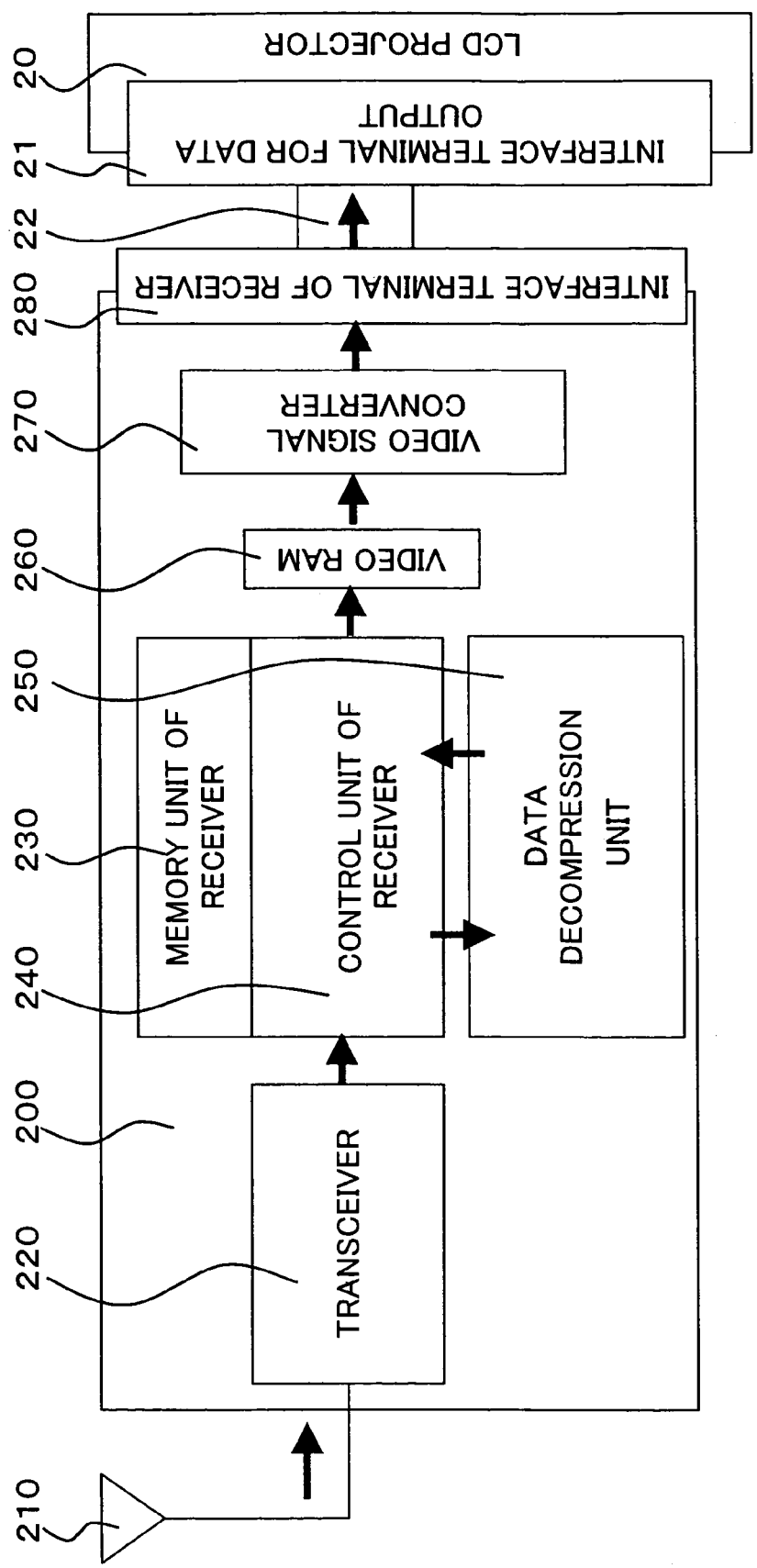
FIG. 2 is a LCD projector side communication unit.

FIG. 2 shows the structure of the LCD projector side communication unit 200. The LCD projector unit 200 has an antenna to capture the data from the PC side communication unit 100, a transceiver unit 220 to receive the data and to send a confirmation signal whether reception was good or not, a receiver side control unit 240, a receiver side memory unit 230, a decompression or decompressing unit 250 to recover the data from the decompressed form, a video RAM 260 to store the information needed to draw an image, and a video signal transforming device 270 and a receiver side interface 280. The LCD projector 20 has a data providing side interface terminal 21. The LCD projector side communication unit 200 and the LCD projector 20 are connected directly to the receiver side interface terminal 280 and the data output side interface terminal 21 by a connector 20 or by using a cable.

The antenna 210 can be either mono-directional or multi-directional. The transceiver unit 220 receives the data sent by the PC side communication unit 100, and sends the confirmation signal whether reception was good or not to the PC side communication unit 100. The receiver side memory unit 230 stores the data decompressed at the data-decompressing unit 250. The volume of the memory is undefined. It may be arbitrary, for example, a memory size of one full frame of an image or a half frame of an image. The data decompression unit 250 decompresses the compressed data to recover the original data from the compressed form. The receiver side interface terminal 280 may accept the power of operation from the LCD projector 20.

Next, to the image compression method is described. If the color grade is 'Full Color', 16 bits of color attribute is needed for each pixel of the image. But if it is just 8 different colors, then 3 bits of color attribute is necessary for a pixel. The number of pixels for XGA (extended Graphic Array) standard is 1024 pixels on a row and 768 pixels in column, and 786,432 pixels in total. The 'Full Color' grade has 16 bits of color attribute so that one full frame of image of full color XGA image is comprised of 12,582,912 bits of data without any compression. On the contrary, the number of pixels of the LCD projector for SVGA (Super Video Graphic Array) standard has 800 pixels on a row and 600 pixels on a column and 480,000 pixels in total. When each pixel has a choice from 8 different colors, in other words, 3 bits of color attribute, total number of bits is 1,440,000 bits, which is 11.44% of data quantity comparing to that of the PC.

Figure 3:
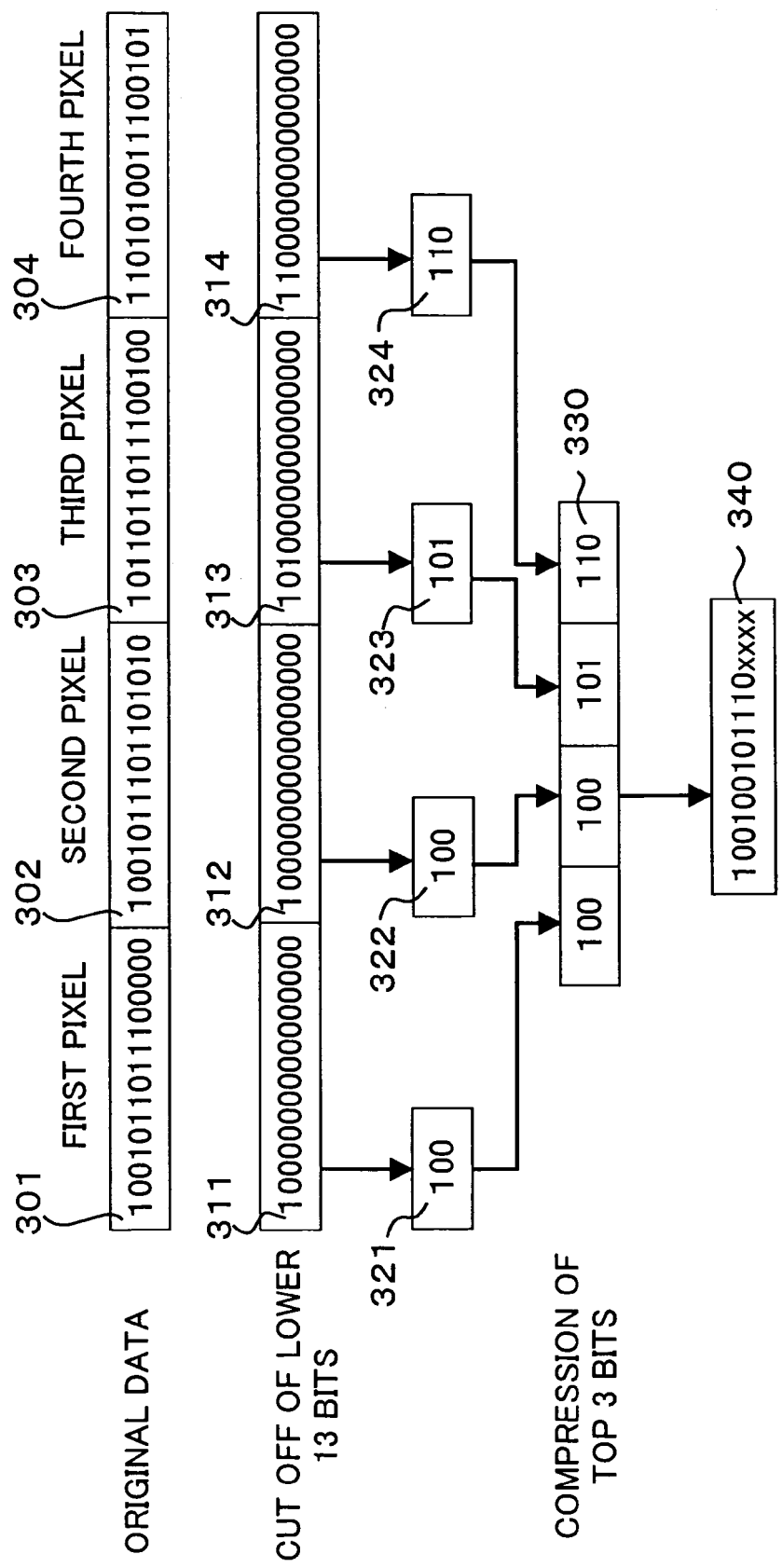
FIG. 3 is a figure to transform the color attribute from 16 bits to 3 bits.

FIG. 3 is a diagram showing the process of conversion from full color image data to RGB (3 fundamental colors) form by using a bit maps. While converting color attribute from full color to RGB form, the upper bits of color attribute are responsible for the gross selection of color and the lower bits of color attribute are responsible for the fine difference in color. When the PC 10 sends a signal indicating that the color attribute is 16 bit long to the transmitter side control unit 130 of the PC side communication unit 100, the transmitter side control unit 130 places a 0 (zero) to the lower 13 bits but not the upper 3 bits of 16 bits color attribute of the 1st pixel to the 3rd pixel 301 through 304, and makes the color attribute 311 and 314. Then, 3 upper bits of color attribute are extracted from each pixel 311 and 314 to form the upper bits data set 321 to 324. The upper bits data set 321 to 324 is shifted leftward 330 and is compressed 340. Instead of the transmitter side control unit 130 of the PC side communication unit 100, the PC 10 itself may possibly perform the compression. No compression process takes place at the transmitter side control unit 130 for this case.

Figure 4:
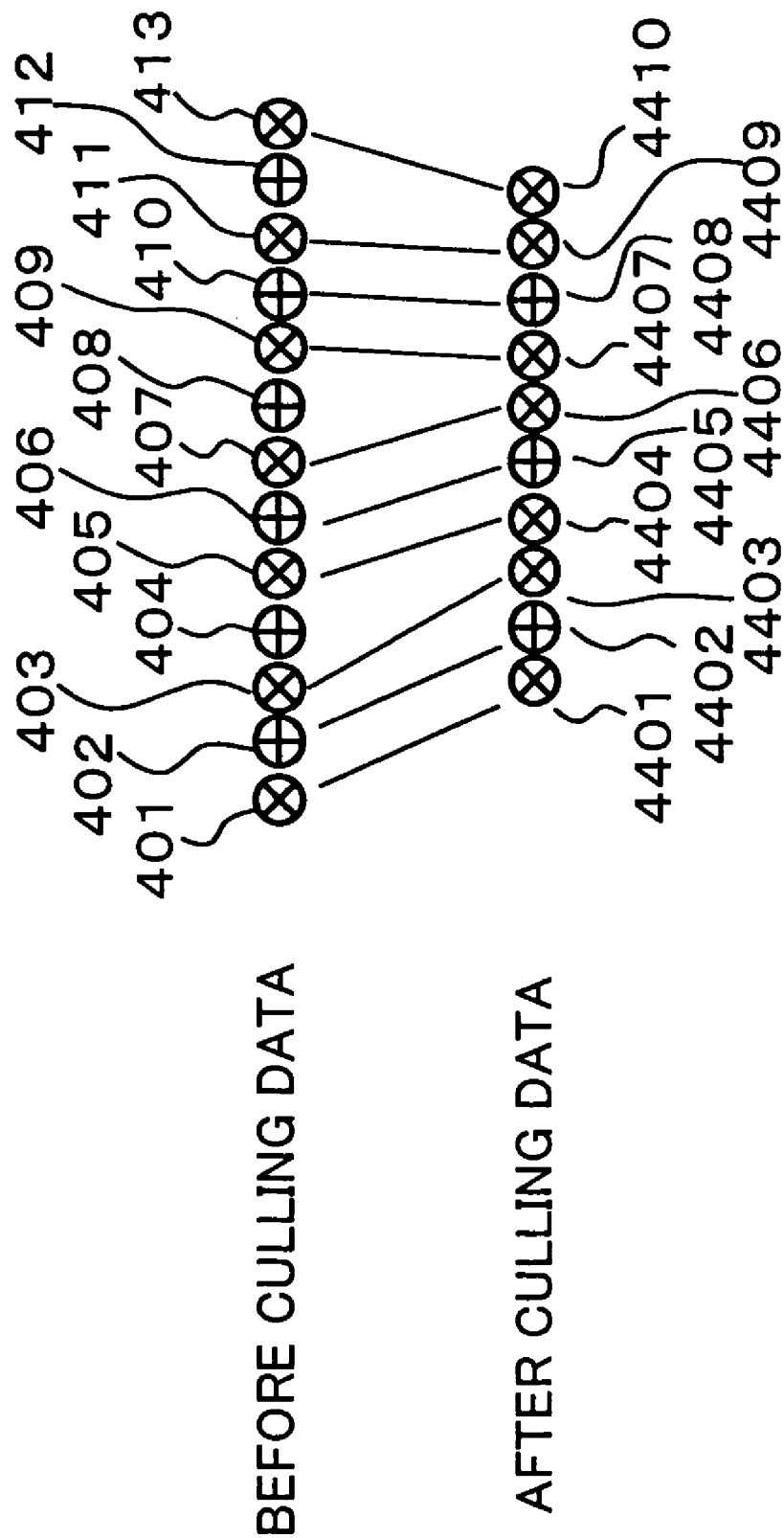
FIG. 4 is a figure of the method to cull pixels.

The culling process of an image data is now described. FIG. 4 shows culling 1 pixel out of every 4 pixels to the horizontal direction. Comparing the XGA standard and the SVGA standard, the number of pixels to the horizontal direction is 1,024 for XGA and 800 for SVGA and the ratio is 1 to 0.78, approximately 4 to 3. Therefore, culling 1 pixel for every 4 pixels of XGA standard makes 768 pixels horizontally, that is a little less than 800 pixels of SVGA standard.

This embodiment signifies to minimize the data quantity before compression, taking into consideration the data quantity required for the image resolution of the destination that the data is sent, by treating the data at the transmitter side before transmission.

Figure 5:
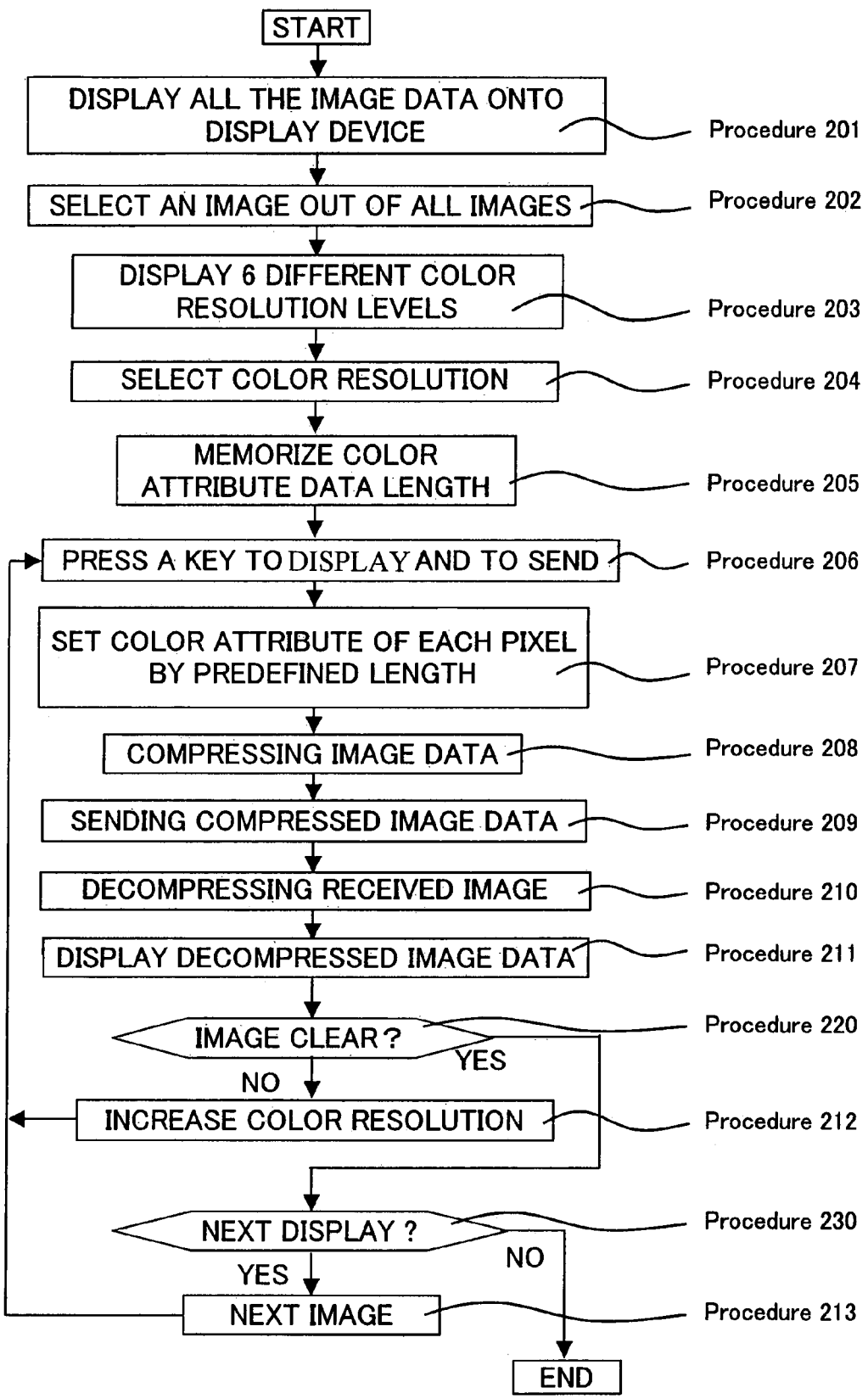
FIG. 5 is a flow chart to increase data transfer rate by sacrificing color resolution.

The method to minimize data transfer time by degrading color resolution is now described. FIG. 5 is a flow chart indicating the method. It takes place when sending an image data without compression between a PC with a display of XGA standard and a LCD projector of XGA standard.

The display of the computer 10 shows all the image of the file including the images of a presentation (Procedure 201). An operator takes a choice of one of the images (Procedure 202). The computer displays the image by 6 different color attribute levels (Procedure 203). The operator chooses one of the 6 color attribute levels (Procedure 204). The computer 10 memorizes the selected color attribute level as the number of upper bit length of color attribute (Procedure 205). Hypothetically the 6 bits of color attribute is selected here. The operator presses a key on the computer 10 either 'Display' or 'Send' (Procedure 206). When the key is pressed, the computer 10 converts the color attribute of each pixel of the image into the number of color attribute bits, which are upper 6 bits (Procedure 207). The data-compressing unit 140 of the PC side communication unit 100 compresses the image data (Procedure 208). The compressed data is sent (Procedure 209). The LCD projector side communication unit 200 decompresses the image data sent (Procedure 210). The decompressed image data is sent to the LCD projector 20 and the LCD projector 20 displays the image (Procedure 211). If the color resolution is judged to be not good enough, the length in bits of color attribute can be increased from 6 to, for example, 8 (Procedure 212). Thereafter, the process flow continues from the procedure 206 as follows: The operator presses a key on the computer 10 either 'Display' or 'Send' (Procedure 206). When the key is pressed, the computer 10 converts the color attribute of each pixel of the image into the number of color attribute bits, which are upper 6 bits (Procedure 207). The data compressing unit 140 of the PC side communication unit 100 compresses the image data (Procedure 208). The compressed data is sent (Procedure 209). The LCD projector side communication unit 200 decompresses the image data sent (Procedure 210). The decompressed image data is sent to the LCD projector 20 and the LCD projector 20 displays the image (Procedure 211). If the quality of the displayed image is good enough, the current level of resolution is kept. If there are more images to display, it provides the next image (Procedure 213). The procedures from Procedure 206 through Procedure 230 continue until no more images to be displayed are encountered (Procedure 230).

The radio transfer unit is supposed to have its data transfer rate of 1-mega bits per second. It takes almost 6.3 seconds for only the data transfer time taking into consideration of the data volume 6,291,456 bits of a full frame of XGA standard 786,432 pixels with 8 bit color attribute for each pixel. The same condition as above except with 3 bits color attribute has a data volume of 2,359,296 bits and the data transfer time becomes about 2.3 seconds. In general a computer handles data transmission so that execution time of the computer has to be added to the actual transfer time. But the actual data transfer time reaches nearly 3 times better. Sacrificing the image resolution makes possible to shorten the data transfer time. This embodiment entails making a software to decrease the number in bits of color attribute from 8 to 3 and the method for the presenter to take one from 6 choices.

The radio communication in general is a synchronized and a unique frequency is often in use so that it is very common for radio data transfer to takes more time than the wired method. When a presentation is performed by a LCD projector with a radio communication unit, it is not always necessary to have the highest possible resolution. There may be an image that may be better to use the highest resolution, an image that is permitted even in the very low resolution, or an image to be redisplayed with higher resolution than the first time, as sacrificing resolution minimizes data transfer time. When the presentation time is tight, shorter data transfer time allows for time to be used efficiently. It is important to choose the transfer time to perform the fluent presentation and image resolution by looking at the relation between the transfer time and resolution.

It is very common for a LCD projector to have no more than 256 color resolution and the minimum is 8 colors. 256 colors require 8 bits color attribute and 8 colors requires only 3 bits color attribute. The color resolution can be selected from 6 different levels.

Figure 6:
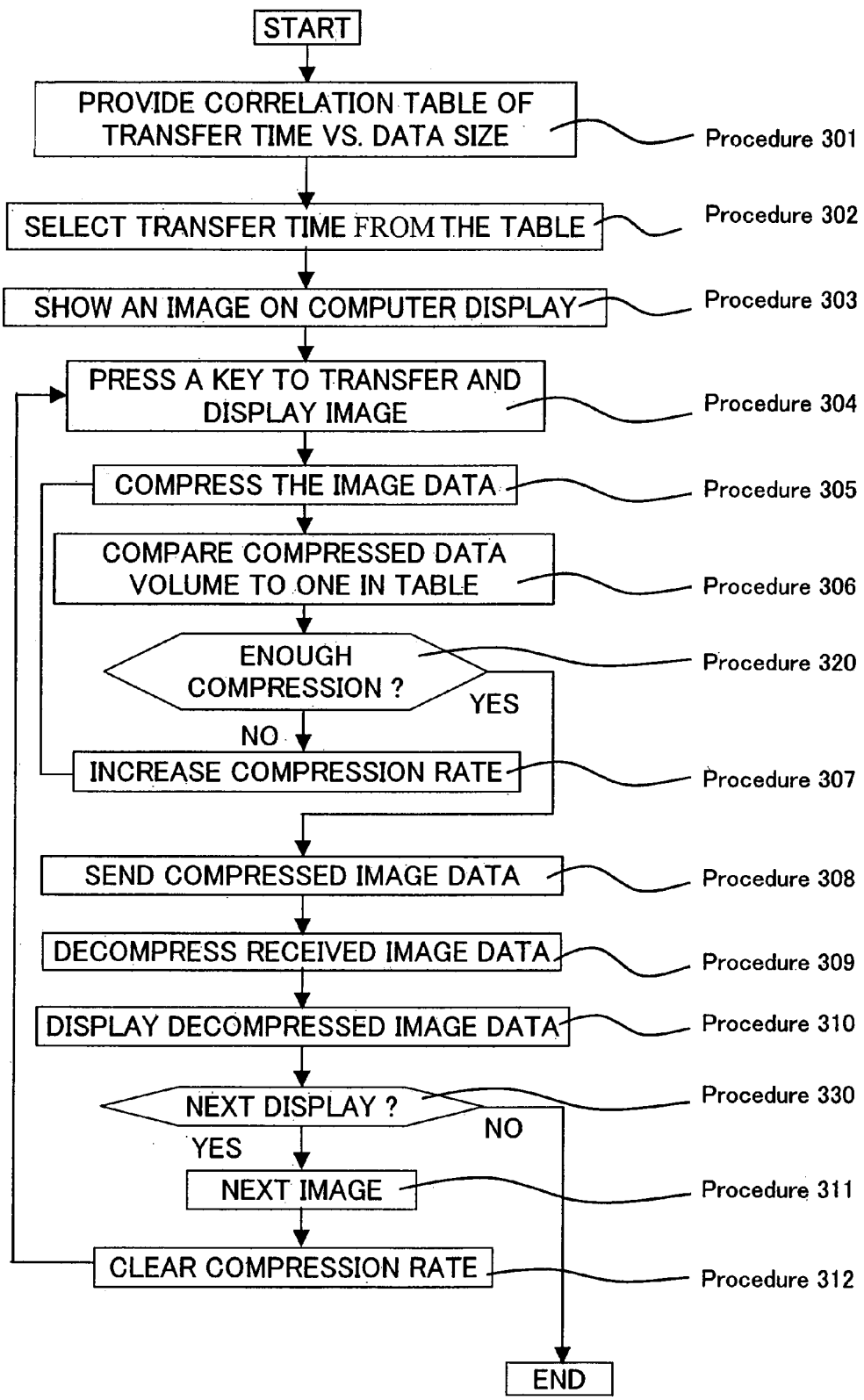
FIG. 6 is a flow chart to indicate the image data transfer by auto compression rate transform.
Figure 7:
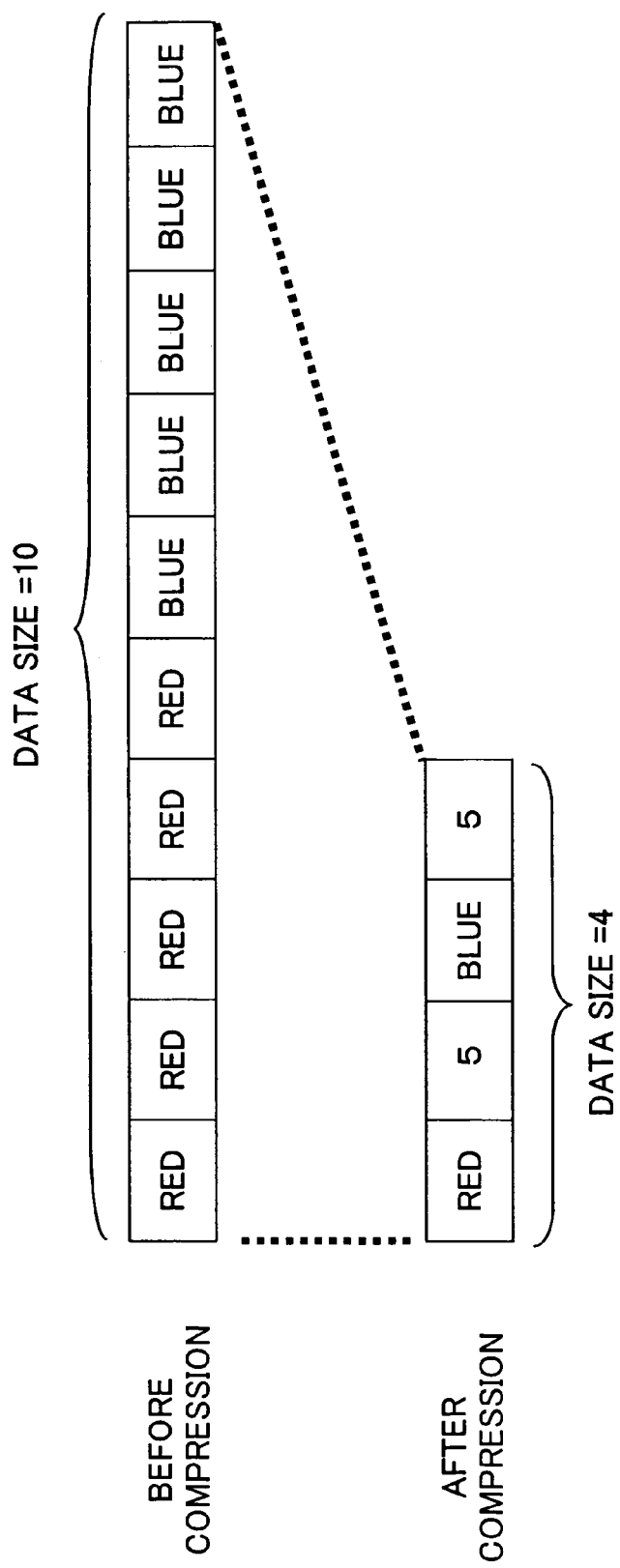
FIG. 7 is a figure of compression by color.

FIG. 6 shows the flow chart of image transmission by auto compression rate transform. This embodiment explains the method to unify the displaying required time as the sum of transmission time, compression time and decompression time by lowering the color resolution in order to fit the specific data volume when the data volume after compression exceeds the specific volume. This method, however, is not applied when the displaying required time does not exceed the predefined length of time.

A table indicating the relation between the lengths of time required for displaying an image on a LCD projector 20 and the data volume is provided (Procedure 301). The operator of the LCD projector 20 selects the displaying required time (Procedure 302). The image with resolution of the selected displaying required time shows up on the computer display (Procedure 303). The operator presses either the 'Display' key or 'Send' key (Procedure 304). When the key is pressed, the computer 10 compresses the image data (Procedure 305). The data volume after compression is compared with the data volume corresponding to the selected displaying required time (Procedure 306). The data volume after compression is bigger than the selected data and if the compression rate is not enough (Procedure 320), the compression rate is increased (Procedure 307). In order to increase the compression rate the bit of color attribute is eliminated one by one from a lower side. The elimination is applied color attribute of all the pixels of the image and it returns to the compression of the Procedure 304. On the other hand, for the case that the compression rate is enough (Procedure 320), the compressed image data is transmitted (Procedure 308). The image data sent is decompressed (Procedure 309). The decompressed image data is sent to the LCD projector 20 and is displayed (Procedure 310). For the case in which a next image is available the next image is provided (Procedure 311). The compression rate is put back to the original value (Procedure 312). When it is considered that there are no more image to display (Procedure 330), the procedure comes to an end.

A data compression method is largely dependent on the number of colors and screen size of the data before compression so that the compression rate is sometimes altered largely and the data volume after compression is different from one image to another. In the case of performing a presentation using the LCD projector 20 having the radio communication unit connected, it is very common for several seconds of transfer time to be required. If the length of time until displaying of an image is different for every image, this may present a difficulty to the presenter due to an interval between explanation of each slide. Principally, the presentation is required to be fluent and it is better for the presenter to devise the way to take an interval if the length of time from start of data transfer to displaying is constant.

In this embodiment the color attribute is 16 bits because of using the XGA standard and full color grade. The color attribute of each pixel, therefore, becomes 15 upper bits by suppressing the lowest bit of color attribute. In this example, the compression rate increases by suppressing the bit of color attribute in the order from lower side and the length of time until displaying becomes constant by making the data volume after compressing smaller than the data volume corresponding to the selected displaying required time and putting the data volume of each image in constant. The statement above makes an effect to unify the length of data transfer time as a constant.

What is claimed is:

1. An image compression method comprising the steps of:
    providing at least one display image comprising pixels each including color attribute data separated into upper bits and lower bits;
    eliminating the lower bits of the color attribute data for each pixel of the display image;
    extracting the upper bits of the color attribute data for each pixel of the display image; and
    combining together the extracted upper bits of the color attribute data for each pixel of the display image to thereby compress the display image.

2. An image compression method according to claim 1; wherein the at least one display image provided in the providing step comprises a plurality of display images; and further comprising the step of changing the number of the upper bits of the color attribute data for each of the display images.

3. A data communication system comprising:
    a control unit that receives a command for compressing a display image from a computing system via an interface, the display image comprising pixels each including color attribute data separated into upper bits and lower bits; and
    a data compressing unit that compresses the display image in accordance with the command received by the control unit by eliminating the lower bits of the color attribute data for each pixel of the display image, extracting the upper bits of the color attribute data for each pixel of the display image, and combining together the extracted upper bits of the color attribute data for each pixel of the display image.

4. A data communication system according to claim 3; wherein the display image comprises a plurality of display images each compressed by the data compressing unit; and wherein during compression of each of the display images by the data compressing unit, the number of the upper bits of the color attribute data for each of the display images is changed.

5. A data communication system according to claim 4; further comprising a transceiver unit that radio transfers image data of each of the display images compressed by the data compressing unit.

6. A data communication system according to claim 5; wherein during compression the data compressing unit changes the compression rate for each of the display images in order to unify a transfer period of time for each of the display images.

7. A data communication system according to claim 4; wherein during compression the data compressing unit changes the compression rate for each of the display images in order to unify a transfer period of time for each of the display images.

8. A data communication system according to claim 3; further comprising a transceiver unit that radio transfers image data of the display image compressed by the data compressing unit.

9. A data communication system according to claim 8; wherein the display image comprises a plurality of display images each compressed by the data compressing unit; and wherein during compression the data compressing unit changes the compression rate for each of the display images in order to unify a transfer period of time for each of the display images.

10. A data communication system according to claim 3; wherein the display image comprises a plurality of display images each compressed by the data compressing unit; and wherein during compression the data compressing unit changes the compression rate for each of the display images in order to unify a transfer period of time for each of the display images.

* * * * *